May 5, 1942.　　　R. C. KINSMAN　　　2,281,882
COUPLING
Filed July 27, 1940　　　4 Sheets-Sheet 1

Inventor
Russell C. Kinsman
by Roberts Cushman Woodbery
Att'ys.

May 5, 1942.  R. C. KINSMAN  2,281,882
COUPLING
Filed July 27, 1940  4 Sheets-Sheet 2

Inventor
Russell C. Kinsman
by Roberts Cushman Woodberry
att'ys.

May 5, 1942.　　　　R. C. KINSMAN　　　　2,281,882
COUPLING
Filed July 27, 1940　　　　4 Sheets-Sheet 3

Inventor
Russell C. Kinsman
by Roberts Cushman & Woodberry
Attys.

Patented May 5, 1942

2,281,882

UNITED STATES PATENT OFFICE 2,281,882

COUPLING

Russell C. Kinsman, Fairfield, Conn., assignor to Manning, Maxwell & Moore, Incorporated, New York, N. Y., a corporation of New Jersey Application July 27, 1940, Serial No. 347,901

12 Claims. (Cl. 285—53)

This invention pertains to a coupling device, for example, a device of the kind commonly known as a "union" and wherein an internally screw-threaded collar or "union nut" engages an externally screw-threaded element fixed to or forming an integral portion of one of the parts which are to be united and also engages an unthreaded flange element fixed to or forming an integral portion of the second of the parts which are to be united. The parts which are thus to be united usually have passages through them—the union nut normally functioning to draw and hold said parts together in leak-tight contact with the respective passages in axial alignment, but permitting separation of said parts when it is desired to do so. Usually the two parts which are thus connected by the union nut are respectively a sleeve or ferrule which slips over and is sweated, brazed, soldered or otherwise permanently united to a pipe-section, conduit, tubular instrument-boss, valve casing or the like and which has a radial externally screw-threaded flange with which the threads of the union nut engage, and a sleeve which slips over an associated pipe-section, conduit, receptacle or the like and which, like the aforesaid sleeve or ferrule, is permanently secured to its respective part, said latter sleeve having a radial, external flange, disk-member or shoulder for engagement by the nut. This external flange, disk-member or shoulder just referred to is unthreaded and has a radial face which normally engages a complemental surface of an inwardly directed radial flange of the union nut. In order to accomplish the intended purpose the inner or minimum diameter of this radial flange of the nut is less than the maximum diameter of the unthreaded flange or disk member of the last-named sleeve, so as to insure an annular area of contact between the disk member and the nut flange. Thus no possible manipulation of the parts will permit the nut to be disengaged from the disk member or flange and its complete removal from the pipe section to which the disk member is fixed, except in those instances where it is possible to slip the nut along the pipe-section, conduit, instrument part or the like, away from the disk member and from off the end of the pipe section or the like. In other words only when one end or the other of the pipe section or equivalent device is devoid of fittings or enlargements (over which the union nut cannot be slipped) is it possible completely to separate the nut from its associated pipe section.

An object of the present invention is to provide a coupling device, for example a union, comprising in general the three usual parts, to wit, threaded flange, unthreaded flange or disk member, and union nut, but so devised as to permit the union nut to be disengaged and completely removed from the pipe section or the like to which the unthreaded flange or disk member is secured, even though such pipe section be provided with fittings or permanently attached parts too large to pass through the union nut. A further and more specific object of the invention is to provide a union for connecting a glass-front thermometer or other instrument to a vat or pipe and so designed that, regardless of the size of the case of the instrument, the nut may be completely separated and removed from the other elements of the union.

In referring to "pipe section" herein, this term is intended to include any tubular conduit, whether long or short, and of whatever material—not only actual pipe but also any hollow more or less tubular part, for instance a boss or nipple projecting from a tank, vat or the like; the inlet or exit nipple of a valve; or a bulb-receiving chamber of a thermometric device, etc.

While the present invention is herein illustrated and described as of particular utility in its embodiment in a union, it is also of value in connection with other couplings comprising separable but normally united ring-like or annular elements, for instance valve flanges, where it is desirable completely to remove the flange from the complemental annular part or its associated member.

Other and further objects and advantages of the invention, together with the field of utility thereof, will be pointed out in the following more detailed description and by reference to the accompanying drawings, wherein.

While as above suggested the improved union forming the subject matter of the present invention is of general utility for uniting parts of various kinds designed for various purposes, it is of especial utility for use in connection with conduits designed for conveying material which is intended ultimately for human consumption.

In the commercial preparation of foodstuffs, liquids are commonly conveyed, pumped, stored, weighed and processed, and such treatment of the material makes use of vats, conduits, or pipe lines which are conveniently united to other parts by unions. Thus such unions may be used in making connections or joints in pipe lines or conduits and/or connections between equipment, pumps, storage tanks, weigh tanks, etc., and pipe lines and/or in installing equipment such as valves, recording thermometers, dial thermometers, glass-front thermometers, automatic thermostatic or pressure controllers in heaters, coolers, tanks, pipe lines, vats, or other receptacles.

The importance of sanitation in the food industry, and particularly in the whole-milk field, has been reflected in the existing design and requirements respecting all parts coming into contact with the milk or other food product. Not only is it demanded that all surfaces in actual contact with the product be thoroughly cleaned and sterilized, but also that all parts associated with those in actual contact with the foodstuff be likewise thoroughly cleaned and sterilized. To this end pipe lines, pumps, etc., are designed so far as possible to permit surfaces in actual contact with the product and all closely associated parts, to be removed or made accessible for thorough cleaning, scouring and sterilizing.

For specific illustration, not only is it important that the inside of a pipe line designed for food conveying be immaculately clean, but that the outside of the pipe as well, although never coming into actual contact with the food product, should be equally clean and sterile. When a single piece of equipment was provided with more than one union connection, for instance when a length of pipe was provided with both an inlet and an outlet union connection, it was at one time customary to attach the unthreaded flange or disk member (with the associated union nut) of one of such union connections and the externally screw-threaded flange of the other of such union connections to said piece of equipment, specifically to opposite ends of the length of pipe. In this way fittings, pipe lines and other equipment could be connected easily in succession in the same way that pieces of hose are coupled together one after another. Thus flexibility was assured in assembling piping and equipment layouts and changes in location and rearrangement of parts could easily be accomplished.

As sanitation requirements grew stricter and efforts were made to provide equipment that could be more easily and thoroughly cleaned, it became evident that all movable parts of the fittings should be detachable one from another so far as possible, and the previous practice just above referred to is no longer considered admissible. Sanitation requirements and accepted practice now require that equipment shall be so designed and plants so laid out that the externally screw-threaded flange member of a union shall form a permanent part of such devices as tanks, vats, pumps, heaters, coolers or other equipment too large to be placed conveniently in a sterilizing solution. This facilitates the washing and scouring of such large pieces of equipment, since there is no movable part, such as an attached union nut, to cause trouble in cleaning. On the other hand, the unthreaded shoulder or disk member of the union with its associated (and commonly inseparable) union nut, is primarily employed on pipe lines and comparatively small and usually portable pieces of equipment, such as glass-front thermometers, dial thermometers, recording thermometers, temperature controllers, pressure controllers or the like.

Figure 13:
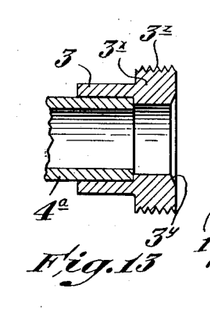
Fig. 13 is a fragmentary diametrical view illustrating the sleeve and threaded flange of an ordinary pipe union.
Figure 14:
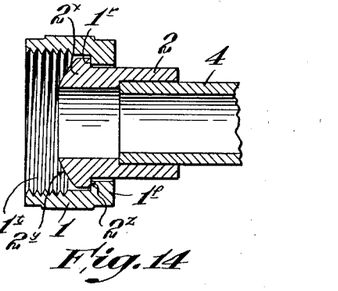
Fig. 14 is a similar view showing the unthreaded flange and union nut of an ordinary pipe union.

A typical union of the usual prior type designed for connecting two lengths of pipe is illustrated in Figs. 13 and 14 for example. According to common practice, such a union comprises a sleeve 2 which is telescoped over the end portion of a pipe section 4 and which is soldered, sweated, brazed, or otherwise permanently secured, to said pipe section. This sleeve 2 is provided with an integral radial flange 2$^x$ which is unthreaded but which usually has a beveled end face 2$^y$. The union also comprises a ferrule 3 (Fig. 13) which is telescoped over the end of the pipe section 4$^a$ and which is permanently united to the pipe section by soldering, brazing, sweating or otherwise, such ferrule 3 having the thickened end portion or flange 3$^x$ which is externally screw threaded at 3$^z$. The end face 3$^y$ of the flange 3$^x$ is complementally beveled for engagement with the beveled end 2$^y$ of the flange 2$^x$. This latter flange has a radial face 2$^z$ for engagement with a corresponding radial face 1$^r$ of an inwardly directed annular flange 1$^f$ of the union nut 1. This union nut has screw threads at 1$^t$ for engagement with the screw threads 3$^z$ of the flange 3$^x$. Since the function of the union nut is to draw the elements 2 and 3 toward each other and to hold them rigidly together in leak-tight contact, it is necessary that the diameter of the flange 2$^x$ of the ferrule 2 be greater than the minimum internal diameter of the flange 1$^f$ of the union nut. The inside diameter of the threaded portion 1$^t$ of the union nut must be slightly greater than the external diameter of the flange 2$^x$ in order to permit ready assembly of the union nut with the part 2, but after the nut 1 and the flange 2$^x$ have been assembled and the part 2 has been permanently secured to the pipe section 4, it is impossible to remove the union nut from the assembly comprising the parts 2, 2$^x$, and 4, except by moving the union nut axially along the pipe 4 away from the flange 2$^x$. In many installations complete removal of the union nut from the pipe 4 in this way cannot be accomplished by reason of the fact that the pipe 4 is connected to or has mounted thereon parts too large to pass through the union nut, and thus in such instances it is not possible as a practical matter, to remove the union nut from its associated parts for cleaning. This loose part 1 with its internal threads at 1$^t$ presents substantial difficulty to the cleaner unless it is possible to immerse the entire appliance to which the pipe section 4 is secured, in the cleaning fluid and this is not always possible by reason of the size or immovability or the character of the apparatus to which this pipe section 4 is permanently secured. As examples of this difficulty, it may be noted that at times it is requisite to make up sections of pipe having a part like the part 2, 2$^x$ and its associated nut 1, secured to each end of a given pipe section. In such an arrangement, since the internal diameter of the flange 1$^f$ of the union nut is less than the external diameter of the unthreaded flange 2$^x$, the union nuts cannot be removed from the assembly for cleaning and if the pipe section be of considerable length or in a location difficult of access, the cleaning of the parts of the union may be quite difficult. Again it sometimes happens, for reasons beyond control, that the part 2, 2$^x$ with its associated union nut 1, must be secured in liquid-tight connection to the inlet or outlet of some receptacle or the like of large dimensions, while the complemental part 3 with its screw-threaded flange 3$^x$ is fixed to some other part. In such instance it may happen that the part 2, 2$^x$ with its associated nut 1 will be mounted at the end of a short piece of pipe or conduit whose other end is permanently secured to a receptacle of large dimensions, although as above described, it is preferable to have the stationary threaded part 3, 3$^x$ attached to the receptacle. In the instance just mentioned in which the part 2, 2$^x$ is permanently secured to a receptacle by means of an intervening length of pipe, it is obvious that the union nut cannot be removed since in most instances the receptacle would be altogether too large to pass through the union nut.

One particular utility of the invention is in connection with thermometers such as are commonly employed in the dairy industry. Such a dairy thermometer customarily has a case including a vertical portion in which is installed the visible part of the mercury or other fluid column and which is provided with the graduated scale, and a substantially horizontal portion or elongate boss, usually of cylindrical shape, which constitutes a housing for the thermometer bulb and which, in use, has its free extremity immersed in the body of liquid undergoing treatment, for instance, milk contained in a vat or pipe. Ordinarily the elongate boss or bulb housing of the thermometer case is provided with a part which constitutes the unthreaded flange or disk member of the union, while the pipe or vat is furnished with the complemental screw-threaded flange of the union. The upright portion of the case of a standard dairy thermometer is of such transverse dimensions as to preclude its passage through the union nut, and although it has been proposed to make this portion of the thermometer case small enough to enable it to be passed through a standard union nut, such procedure necessitates making the case of a size substantially less than that to which the trade has become accustomed and does not in the least solve the problem for the many users already provided with standard thermometers.

Figure 1:
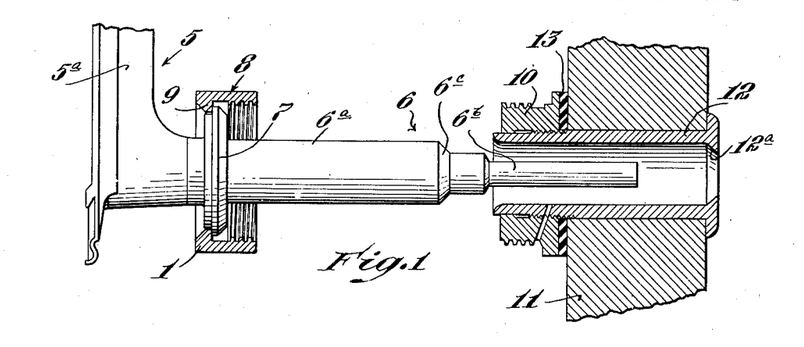
Fig. 1 is a fragmentary side elevation of a glass-front vat thermometer such as is used for dairy purposes and which is provided with a union nut for securing it to a fitting projecting from the side wall of a tank or vat, the nut and fitting being shown in diametrical section, the thermometer with its nut being disconnected from the vat.
Figure 2:
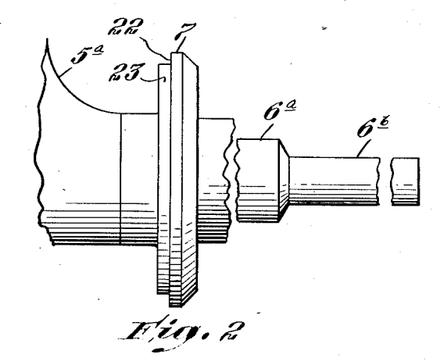
Fig. 2 is a fragmentary side elevation, to larger scale than Fig. 1, illustrating a portion of the thermometer case with its bulb-receiving boss and the unthreaded flange of a disk-like member which is secured to the latter, but with the union nut removed.

A usual type of thermometer having a case too large to pass through the union nut is illustrated in Fig. 1 wherein the numeral 5 designates a glass-front thermometer such as is commonly used in dairy work in association, for example, with Pasteurizing apparatus. Such a thermometer usually has a substantially horizontal boss or extension member 6, which is usually a tubular or hollow casing constituting a protective housing for the thermometer bulb or other thermostatic temperature-responsive element. When the thermometer is intended for use with a vat, the boss or housing 6 of the thermometer case is commonly provided with an elongate portion 6$^a$ of relatively large diameter, designed to fit within a suitable bushing which lines an aperture in the side wall of the vat, this portion of large diameter furnishing a stiff, rigid support for the thermometer. However, the free end portion 6$^b$ of the elongate boss 6 may be of relatively small diameter, for example, just sufficient to house the sensitive thermostatic element, and being designed in use to extend into the body of liquid within the vat.

As illustrated in Fig. 1, the part 6$^a$ corresponds to the element 2 of the union of Figs. 13 and 14 and has fixed thereto the unthreaded radial flange or disk member 7 which corresponds to the flange 2$^x$ of Fig. 14. This flange or disk member 7 is fixed to the extension member 6 of the thermometer case at a point spaced from but adjacent to the upright portion 5$^a$ of the case, and a union nut 8 is assembled with this flange or disk member 7, having its inwardly directed flange 9 overlapping the flange or disk member 7 as indicated in Fig. 1. The externally screw-threaded flange 10, Fig. 1 (corresponding to the part 3ˣ of Fig. 13), is fixedly secured to the side wall 11 of a vat, for example, by internally screw-threaded engagement with a flanged bushing 12 projecting through the wall 11 of the vat or receptacle, and with suitable packing 13, if desired, interposed between the inner end of the part 10 and the outer surface of the receptacle. The internal diameter of the bushing 12 is such that the part 6ª of the thermometer case may fit freely within it. In use, the extension or boss 6ª of the thermometer case is fitted into the bushing 12 so that the part 6ᵇ is immersed in the fluid in the vat. The union nut 8 is then rotated so that fluid-tight contact is obtained between faces 6ᶜ and 12ª and a steady and firm support for the thermometer case is provided. The thermometer may be removed from the vat for cleaning by loosening the nut 8 and turning it reversely so as to separate it from the part 10. However, except for the present improved construction now to be specifically described, it would not be possible to remove the nut 8 from its assembly with the thermometer and it would thus be necessary either to immerse the entire thermometer in the sterilizing medium, which is not usually desirable, or to use great care in thoroughly cleaning the union nut.

As already noted, it has heretofore been proposed, in so far as a glass-front thermometer is concerned, to make the thermometer case of such shape and dimensions as to permit the entire case to be passed through a union nut of standard size, but this necessitates the use of a thermometer of unusual shape and dimensions which may not be acceptable for certain purposes, or available to all users. It has also been proposed to provide the union nut and its associated usually unthreaded flange with partial threads such, for example, as those used in securing the breech block of a heavy gun to the breech of the gun so that a partial turn will permit the nut to be slipped axially from off of the flange, but this necessitates substantially increasing the axial lengths of the nut and flange which makes it undesirable for many purposes. Other suggestions have required the addition of parts to the union, for instance split rings, snap rings or the like, but all such additions of loose elements cause trouble to the user, increase the difficulty of sanitary cleaning, invite trouble from loss of parts, and in most respects are undesirable from the practical standpoint.

The improved union nut herein disclosed permits removal of the nut from its complemental unthreaded flange element, regardless of how the latter may be mounted or to what equipment it may be attached, and thus facilitates cleansing of the union nut and its associated parts, so that all sanitary requirements are readily fulfilled.

To this end, in accordance with the present invention, the inwardly directed flange 9 of the union nut 8 (Figs. 3 and 10) is furnished with slots or notches 14, symmetrically disposed at opposite sides of a given diameter (as illustrated, the vertical diameter) and so arranged and designed that by proper manipulation of the nut with reference to the unthreaded flange or disk member 7 it is possible to pass the flange or disk member 7 completely through the nut so as to separate the nut from the flange and permit the nut to be slipped off over the free end of the part 6. Although the nut as thus modified is readily removable from its associated flange 7, no additional members are requisite and the nut need not be substantially weakened. Neither is the structure of the nut unduly complicated from the standpoint either of manufacture, use or cleaning. The present invention provides for so designing the nut as to permit separation of the nut from its associated parts, as described, while preserving all necessary strength in the essential parts of the nut.

The operation of removing the nut from its associated flange or disk member 7 is illustrated in Figs. 4 to 8 inclusive, and will be considered at this point as best facilitating understanding of the practical application of the principle involved.

Referring to these figures, the numeral 6ª designates, for example, the elongate cylindrical part above referred to, and to which is secured the unthreaded flange or disk member 7 of the union—the part 6ª being permanently fixed to a member 5ª which represents for example the lower part of the case of a glass-front thermometer which is too large to be passed through the union nut. The part 6ª extending to the right of the flange 7, as shown in these several figures, may be assumed to be of the largest diameter and greatest length of any part which will ever be encountered in a construction of this character, in this instance representing the type of thermometer extension which is employed when the thermometer is installed directly in an opening in the wall of a vat, as illustrated in Fig. 1. Thus, as illustrated, the outside diameter of the part 6ª may, for example, be of the order of one-half the internal diameter of the screw-threaded portion of the nut and may normally extend through the nut from the inner face of the flange or disk member 7 to a distance which is, for example, of the order of three or more times the axial thickness of the nut.

Figure 9:
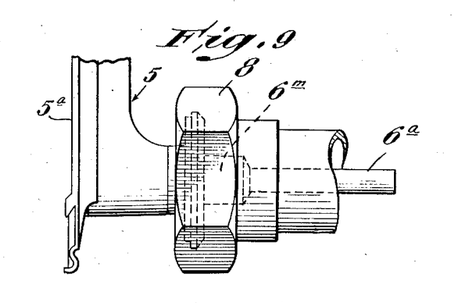
Fig. 9 is a fragmentary side elevation, to smaller scale than Figs. 2 and 3, illustrating a glass-front thermometer designed for installation in a pipe section, and showing parts of the union nut in assembled relation.

As compared with the arrangement shown in Figs. 4 to 7, the thermometer extension or boss 6ᵐ (Fig. 9) which is employed when the thermometer is mounted directly on a pipe line, would ordinarily be of substantially less diameter and of less length, as referred to the diameter of the union nut, than in the case just above referred to, and would thus present less difficulty in manipulation of the parts for removing the union nut from the flange.

Figure 3:
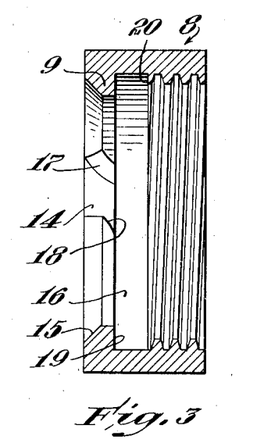
Fig. 3 is a diametrical section, to substantially the same scale as Fig. 2, of a union nut embodying the present invention, but constructed in accordance with theoretical methods, the nut being shown separated from the parts with which it is usually associated.
Figures 4, 5, 6, 7, 8:
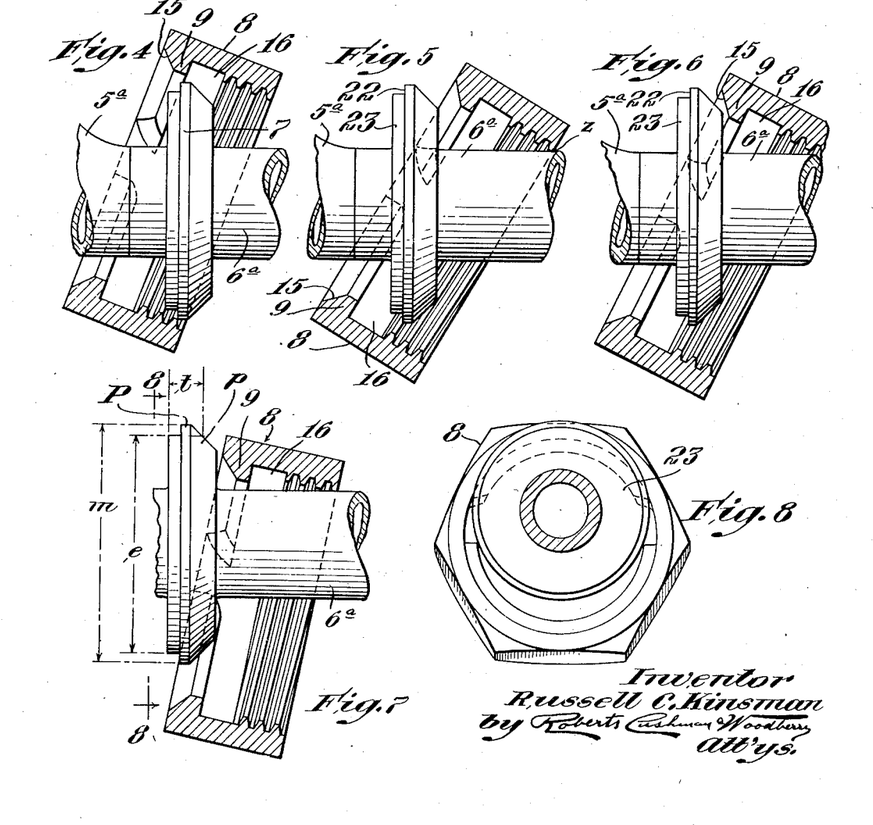
Figs. 4, 5, 6 and 7 are fragmentary diametrical views showing a union nut like that of Fig. 3 and the unthreaded flange or disk member, the nut being in diametrical section, these views indicating successive steps in separating the union nut from the unthreaded flange or disk member.
Fig. 8 is a section substantially on the line 8—8 of Fig. 7.

The union nut 8 of Figs. 3 to 8 is substantially like a standard nut except that the outer surface 15 of the flange 9 is turned down to provide a bevel here shown by way of example as substantially 45° (although an angle as small as 30° is ample), while the threading recess 16 is increased in axial width so as slightly to exceed the diameter of that portion of the thickness of the flange 7 which is indicated by the character $t$ (Fig. 7), that is to say, that portion of the flange which is of a diameter equalling or exceeding the dimension $e$ which is the diameter of that part of the flange 7 which fits inside of the flange 9 of the nut 8. The maximum diameter of the flange 7 is indicated in Fig. 7 by the letter $m$—that portion P of the flange which is of this maximum diameter having a cylindrical periphery, while that portion $p$ which, with the portion P provides the thickness necessary for rigidity, has a beveled or conical periphery preferably sloped at approximately 45°. The threading recess 16 of the nut (Figs. 3 to 7) is bounded on one side by the inner radial surface 19 (Fig. 3) of the flange 9, and at its opposite side by the innermost turn 20 of the internal screw threads of the nut.

Figures 10, 11:
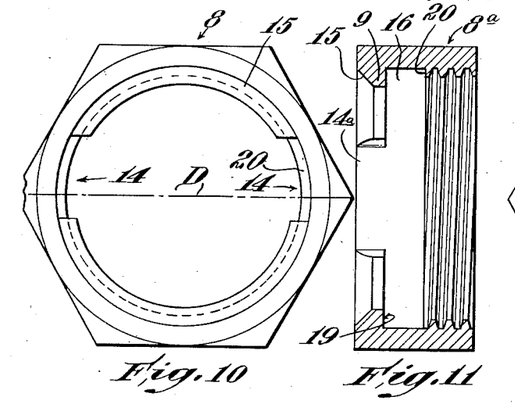
Fig. 10 is an end elevation of a union nut embodying the invention and of a desirable commercial construction.
Fig. 11 is a diametrical section of a nut of modified form.

In accordance with the present invention the flange 9 is furnished with slots or notches 14 as above described, shown in Fig. 10 as disposed symmetrically with respect to the vertical diameter of the nut and with a major portion of each slot or notch disposed above the horizontal diameter D of the nut. As indicated in Fig. 3 each notch or slot theoretically has an upwardly inclined more or less arcuate upper wall 17 curved about a center z (Fig. 5) and a lower wall 18 which is substantially parallel to or concentric with the corresponding upper wall, the slots or notches being of such depth as to remove substantially all of the material of the flange 9, that is to say, so that the side walls of the opposite notches are spaced apart a distance at least equal to the maximum diameter m of the flange 7.

Figure 15:
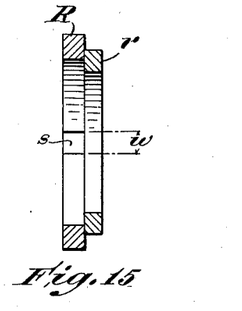
Figs. 15, 16 and 17 are diagrammatic sectional views illustrative of the underlying principle of the invention.
Figure 16:
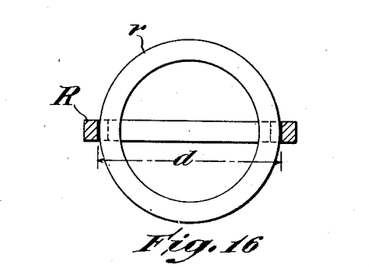
Figure 17:
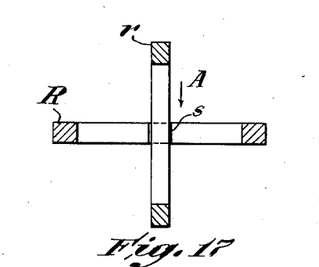
Figure 17A:
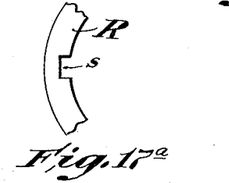
Fig. 17a is a fragmentary radial section through the larger of the rings shown in Fig. 15.

The general theory involved in the novel construction herein disclosed and claimed may perhaps be best understood by reference to Figs. 15 to 19 inclusive. In Fig. 15 the characters R and r represent a pair of plain rings of rectangular section, the outer diameter of the ring r being less than the outer diameter of the ring R, but greater than the internal diameter of the ring R. Obviously the ring r cannot be passed through the ring R except by modification of one or the other of these rings. However, if the ring R be provided at diametrically opposite points with recesses or slots s, each of a width w at least equalling the axial thickness of the ring r and of such radial depths that the distance between their outer surfaces (indicated by the letter d, Fig. 16) is equal to the external diameter of the ring r, then by moving the ring R away from the ring r, and turning it to lie in a plane perpendicular to that of the ring r, as shown in Fig. 17, the ring r may be slid completely through the ring R in the direction of the arrow A (Fig. 17) by causing the ring r to enter and pass through the slots or notches s.

Figure 18:
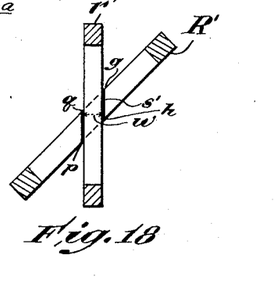
Figs. 18 and 19 are diagrammatic sectional views further illustrative of the principle of the invention.
Figure 19:
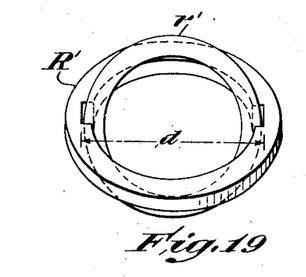
Figure 19A:
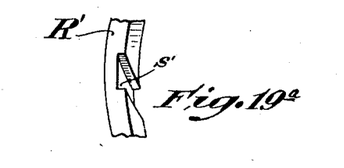
Fig. 19a is a fragmentary perspective view of a part of the larger ring of Fig. 19.

In Figs. 18 and 19 another possibility is indicated with respect to plain rings $R^1$ and $r^1$ dimensioned substantially like the rings R and r above described. However, in this instance the slots or notches s' in the ring $R^1$, are arranged diagonally so that each slot or notch has more or less the rhomboidal shape indicated by the characters g, h, p and q of Fig. 18. Assuming that the transverse width of each slot s', as indicated at w, equals the axial thickness of the ring r', and that the distance between the outer walls of the two slots (indicated by d, Fig. 19) is equal to the outside diameter of the ring r', then it is manifestly possible, by angularly disposing the rings, to slide the ring $r^1$ through the ring $R^1$ in a diagonal direction, as shown in Figs. 18 and 19.

While plain rings may thus be constructed so that one may pass through the other, the matter is not so simple when the ring of smaller diameter is fixed to an elongate axial extension of substantial diameter. To be more explicit, if the inwardly directed flange 9 of the union nut (Fig. 4) be considered the equivalent of the ring R of Fig. 15, or the ring R' of Fig. 18, and the flange or disk member 7 of Fig. 4 be considered the equivalent of the small ring r of Fig. 15 or r' of Fig. 18, it is clear that by reason of the presence of the elongate member $6^a$ extending axially with respect to the flange 7 and firmly fixed to the latter, it would not be possible to swing the flange 7 to a position with respect to the flange 9 corresponding to the arrangement of Fig. 17, and that to permit any such removal of the flange 7, by passing it through notches in the flange 9 (without removal of an undue portion of flange 9) a construction must be adopted more or less approximating that diagrammatically shown in Figs. 18 and 19. Thus in the practical embodiment of the invention, as shown in Figs. 4 to 7 inclusive, the slots 14, as above described, are inclined to the plane of the end of the nut and provided with diagonal upper and lower walls 17 and 18, corresponding in general to the upper wall g, h and the lower wall p, q respectively, of the slot s' of Fig. 18.

Assuming that the initial position of the nut 8 with respect to the flange 9 is that illustrated in Fig. 1, in which the radial surface 22 of the flange 7 engages the radial inner surface 19 of the flange 9 (the portion 23 of the flange 7 fitting within the inner periphery of the flange 9) then in removing the union nut from the flange or disk member 7, the steps to be taken are illustrated successively in Figs. 4 to 7 inclusive. Thus the nut 8 is first moved to the left as respects its position in Fig. 1, and is then tipped substantially to the position of Fig. 4, as permitted by the unusually wide threading recess 16. The nut is then dropped and further tipped to the position of Fig. 5, where the right-hand turn of its screw thread contacts the outer surface of the parts $6^a$ substantially at a point z (Fig. 5) while the edge of the disk member 7 at opposite ends of the horizontal diameter engages the inner edge of the flange 9 of the nut. If it now be imagined that flange 9 of the nut is complete (unnotched) and of a plastic material, and if the lower part of the nut were now swung downwardly and to the right about the point z as an axis, the peripheral portion of the flange 7 at the opposite ends of its horizontal diameter would plow out notches in the opposite portions of the flange 9 which would be of substantially the minimum dimensions necessary to permit passage of the disk member 7 (during the downward arcuate swing of the nut) through the substance of the flange 9. The notches thus plowed out would be substantially of the shape of the notches 14 illustrated in Fig. 3, for example. In actual practice the shape of these minimum dimensioned notches may be obtained by usual principles of geometrical projection so as to provide the exact dimensions necessary to permit the swinging of the nut about the axis z.

Now assuming the prior provision of such notches in the flange 9, and going back to the position of the parts as shown in Fig. 5, the nut may be swung about the point z as an axis so as to cause the flange 7 to pass through the notches whereupon the nut may be dropped down as illustrated in Fig. 7, so as completely to separate it from the flange 7, the latter being now wholly to the left of the flange 9 of the nut. The nut now may be freely drawn off over the free end of the part $6^a$ of the thermometer case.

The described movement of the flange 7 with respect to the flange 9, in determining the dimensions of the notches 14, results in the production of notches of theoretically the exact minimum size. However, it is desirable for ease and manipulation to increase the dimensions of these notches somewhat above the theoretical minimum, and as a practical matter, to facilitate machining, the slots are cut straight through the flange 9, as shown in Fig. 10, the width of the actual slot being the least which will include the theoretical diagonal slot.

Figure 12:
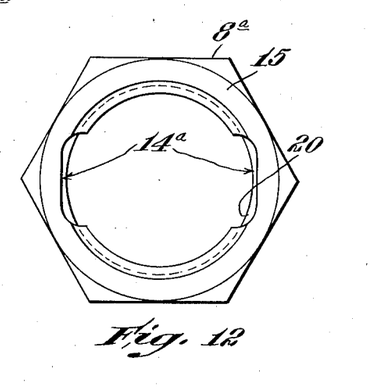
Fig. 12 is an end elevation, to smaller scale, of the nut of Fig. 11.

In the preferred arrangement illustrated in Figs. 3 and 10 the nut can be removed from the flange 7 only by tipping the nut about a horizontal axis in the direction illustrated in Figs. 4 to 7. However, to avoid the necessity of tipping the parts always in the same direction in removing the nut from or assembling it with the flange 7, a modified, although in some respects less desirable, construction may be employed, as illustrated in Figs. 11 and 12. In this arrangement the nut 8$^a$ is of substantially the same type as that previously described, except that instead of inclined notches 14 the nut is provided with elongate notches 14$^a$ at diametrically opposite sides, the notches 14$^a$ being disposed symmetrically with respect to a vertical diameter and each slot being symmetrical with respect to a horizontal diameter. Each notch 14$^a$ may be considered in general as consisting of a pair of notches like the notches 14 above referred to, merged but reversely arranged, so that both the upper and lower end of each notch 14$^a$ corresponds in general to the upper end of the notch 14 of Fig. 10. This arrangement necessitates cutting away a considerable portion of the material, but the nut may be tilted in either direction in removing it from the flange 7.

Figure 20:
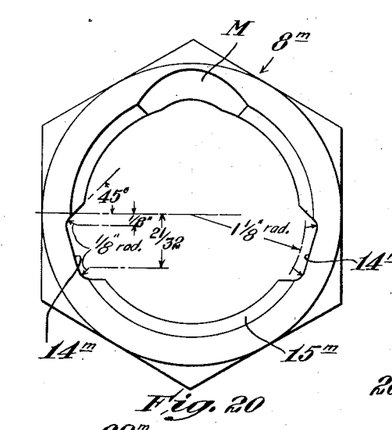
Fig. 20 is an elevation of a union nut of slightly modified form, particularly designed for use in a pipe union of the general type illustrated in Figs. 13 and 14 but embodying the present invention—desirable commercial dimensions being indicated.
Figures 21, 21A:
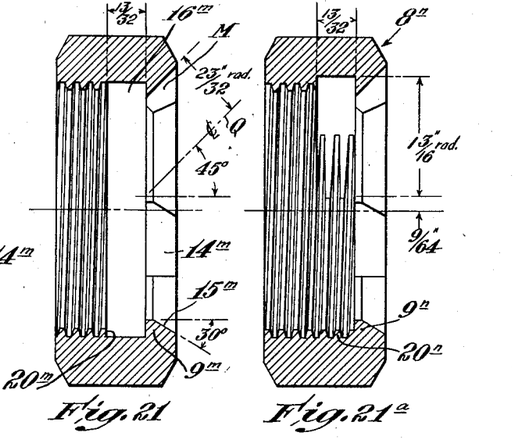
Fig. 21 is a vertical diametrical section of the nut of Fig. 20.
Fig. 21a is a view similar to Fig. 21 but showing a slight modification.
Figures 22, 23, 24, 25:
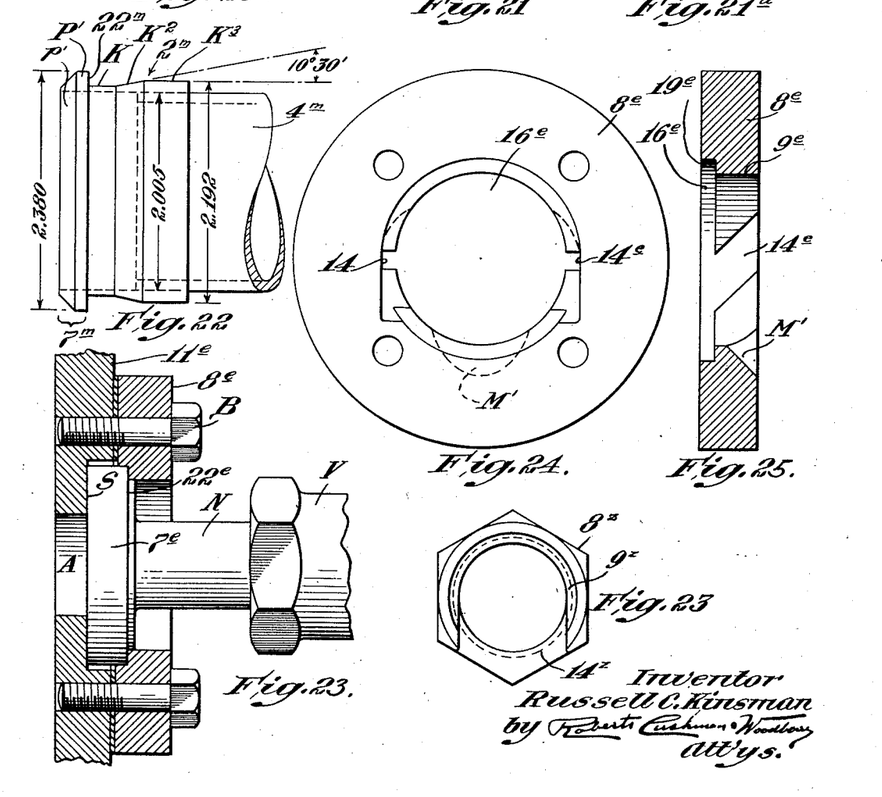
Fig. 22 is a fragmentary side elevation of a pipe-line ferrule designed for cooperation with the union nut of Figs. 20 and 21.
Fig. 23 is a side elevation, partly in vertical section, showing the invention embodied in a valve coupling.
Fig. 24 is an elevation of the attaching annulus of the coupling of Fig. 23.
Fig. 25 is a vertical diametrical section of the annulus of Fig. 24.

Figs. 20, 21 and 22 illustrate a union nut and pipe ferrule embodying the invention and designed to form parts of a pipe coupling. In order more clearly to suggest the problems here involved, certain actual dimensions of the parts have been indicated, but it is to be understood that the invention is not necessarily limited to a device following these precise dimensions.

Whereas in devices, such for example as illustrated in Fig. 1, the tubular part to which the disk member 7 is secured is of a diameter substantially less than the internal diameter of the union nut, the diameter of the corresponding tubular part (pipe of pipe ferrule) in a pipe coupling may be nearly equal to the internal diameter of the nut flange. Thus, in order to permit the nut and disk member to be so disposed that the disk member may be slipped through the slots or gaps in the nut flange, the latter must be provided with clearance for the pipe or pipe ferrule.

Referring to Fig. 22, the piece of pipe 4$^m$ has secured thereto, for example by brazing, the sleeve or ferrule 2$^m$ provided with the radial flange or disk member 7$^m$. This disk member comprises the axially narrow cylindrical portion P' and the outer beveled end $p'$, the latter being somewhat thicker axially than the part P'. The inner, that is to say, the right-hand surface 22$^m$ (Fig. 22) of the part P' is substantially radial and designed to engage the inner surface of the flange of the union nut. To the right of the shoulder 22$^m$ the sleeve or flange 2$^m$ is substantially cylindrical, as shown at K, the cylindrical part being of an external diameter less than that of the part P' and of an axial length substantially as great as that of the flange 7$^m$. Beyond the cylindrical part K, the sleeve or ferrule flares outwardly in diameter, providing a sloping outer surface K$^2$ which intersects the cylindrical outer surface K$^3$ of the body portion of the sleeve within which the end of the pipe 4$^m$ is fitted. The external diameter of the part P' is substantially greater than that of the part K, and slightly greater than that of the part K$^3$.

The union nut 8$^m$ (Figs. 20 and 21) is substantially like the above described nut 8 (Fig. 10), having the inwardly directed flange 9$^m$ provided with the beveled outer surface 15$^m$ and unthreaded clearance space 16$^m$ which terminates at the first internal screw thread 20$^m$. The flange has gaps or recesses 14$^m$ disposed symmetrically with respect to the vertical diameter (Fig. 20) of the nut, and the major part at least of each gap is below the horizontal diameter of the nut. In accordance with the present invention the outer surface of the flange 9$^m$ is cut away at M to provide clearance for the pipe ferrule. This clearance space M may be provided by directing a milling cutter inwardly into engagement with the flange, the axis of the cutter (indicated at Q) being disposed in the plane of the vertical diameter of the nut and intersecting the horizontal axis of the nut at an angle, for example of 45°. When provided with such a clearance it is possible to swing the nut 8$^m$ to lie in a plane so inclined to that of the disk 7$^m$ of the pipe ferrule as to allow the disk 7$^m$ to pass through the gaps 14$^m$ without interference between the ferrule and the flange 9$^m$, so that the nut may be completely separated from the ferrule.

Fig. 21$^a$ illustrates a union nut 8$^n$ similar to the nut 8$^m$ but differing from the latter in omitting the clearance space 16$^m$ of the nut 8$^m$—the screw threads 20$^n$ reaching up to the inner surface of the flange 9$^n$, but being eccentrically relieved to provide space for the ferrule to turn in.

Figs. 23, 24 and 25 illustrate the invention as embodied in a coupling of the kind in which the part which corresponds to the union nut in the above-described arrangements is a heavy annulus having provision for bolting it or otherwise fixing it securely to a support, for instance, to the wall of a tank or vat, such annulus constituting a support for a valve casing or the like forming an attachment to the tank.

Thus in Fig. 23, 11$^e$ indicates the wall of a tank or vat having therein an aperture A. The annulus 8$^e$ (corresponding in function to the union nut above described) is a heavy rigid ring removably secured by bolts B to the outer surface of the tank wall and in concentric relation to the aperture A. The annulus 8$^e$ has a central bore 16$^e$ (Fig. 24) and an inwardly directed flange 9$^e$, (Fig. 25), the inner surface 19$^e$ of the flange being radial and designed to engage the outer radial surface 22$^e$ of a disk member 7$^e$ which is normally clamped between the surface 19$^e$ of the annulus and the abutment surface S of the tank wall. The disk member 7$^e$ is fixedly united, as by brazing, to the stem or nipple portion N of the casing V of a valve or the like—the disk member 7$^e$ having a central aperture which registers with the passage through the nipple N. The flange 9$^e$ of the annulus 8$^e$ is furnished with gaps 14$^e$ symmetrically disposed with respect to the vertical diameter of the annulus (Fig. 24), and if necessary (by reason of the size of the nipple N), the annulus may also be provided with the clearance space M'. The inner diameter of the annulus is necessarily smaller than the diameter of the disk 7$^e$ in order to provide the requisite bearing for clamping the disk to the tank wall, and as illustrated is too small to allow passage of the valve casing V. Ordinarily, with such a construction, the annulus would be slipped over the nipple N before the latter was brazed to the disk member and could not thereafter be separated from the disk member and valve casing. However, with the present arrangement, after removing the bolts B, the disk member and annulus may be so relatively disposed as to allow the disk member to be slipped through the gaps 14e of the annulus, thus permitting complete separation of the parts for cleaning or other reasons.

While certain desirable embodiments of the invention have been illustrated by way of example, it is to be understood that the invention is not necessarily limited to the precise embodiments here described, but is to be regarded as broadly inclusive of any and all equivalent constructions.

I claim:

1. The combination with an instrument having a case provided with an elongate irremovable projecting boss having fixed thereto a disk-like member constituting one element of a union, and a union nut having internal threads for engagement with the other element of the union, said nut also having an inwardly directed radial flange whose inner diameter is too small to permit passage of the instrument case therethrough and which is of such internal diameter that it normally overlaps that surface of the disk-like member which is adjacent to the instrument case, the periphery of the nut, in the plane of said inwardly directed flange, being circumferentially continuous, said inwardly directed flange having slots axially extending therethrough located symmetrically with respect to a diameter of the nut, each of said slots being of a width at least as great as the thickness of that portion of the disk-like member which is of greatest diameter, the walls which define the width of each slot being inclined and making substantially equal angles with the plane of the end face of the nut.

2. The combination with an instrument having a case provided with an elongate irremovable projecting boss having fixed thereto a disk-like member constituting one element of a union, and a union nut having internal threads for engagement with the other element of the union, said nut also having an inwardly directed radial flange whose inner diameter is too small to permit passage of the instrument case therethrough and which is of such internal diameter that it normally overlaps that surface of the disk-like member which is adjacent to the instrument case, the periphery of the nut, in the plane of said inwardly directed flange, being continuous, said inwardly directed flange having slots axially extending therethrough located symmetrically with respect to a diameter of the nut, the major portion of each slot being disposed at the same side of that diameter of the nut which is substantially perpendicular to the aforesaid diameter of symmetry and being inclined with respect to the plane of the end face of the nut.

3. The combination with an instrument having a case provided with an elongate rigid projection to which is fixed a disk-like member constituting one element of a union, and a union nut having internal screw threads for engagement with the other element of the union, said nut also having an inwardly directed flange whose inner diameter is too small to permit passage of the instrument case therethrough, the periphery of the nut, in the plane of said inwardly directed flange, being circumferentially continuous, the disk member including a portion provided with a cylindrical peripheral surface and a substantially radial outer face and a portion having a beveled peripheral surface, the inwardly directed flange of the union nut having a substantially radial inner face which normally overlaps and engages the aforesaid radial outer surface of the disk-like member, said radial inner face of the nut-flange defining one wall of the threading recess whose opposite wall is defined by the innermost screw thread of the nut, said recess at least slightly exceeding in width that part of the disk-like member which exceeds in diameter the inner diameter of the nut-flange, the inwardly directed flange of the nut having a pair of slots therethrough symmetrically located with respect to a diameter of the nut and of such contour and dimensions as to permit the maximum diameter of the disk-like member to pass through the inwardly directed nut-flange only when the nut is disposed at a predetermined inclination with respect to the plane of the disk-like member.

4. The combination with a thermometer having a case provided with an upright portion and a substantially horizontal boss designed to house the thermally responsive element, said boss being provided with a fixed annular flange constituting one element of a union, and a union nut having an inwardly directed radial flange whose inner diameter is too small to permit passage of the thermometer case therethrough and which normally overlaps the outer face of the aforesaid flange element, the peripheral surface of the union nut, in the plane of said flange, being circumferentially continuous, the union nut having internal threads for engagement with a threaded part to which the thermometer is to be attached, the inwardly directed flange of the nut being of an internal diameter less than the maximum diameter of the flange element of the thermometer but being provided with spaced slots so designed and arranged as to permit passage of the flange element completely through the nut-flange only when the plane of the nut and the plane of the fixed annular flange are arranged to intersect to form a dihedral angle, thereby to allow removal of the nut from the thermometer.

5. A union nut for removably uniting parts, one of said parts being of such dimensions as to preclude its passage through the nut and being provided with a disk member which is normally housed within the nut, the nut having an inwardly directed annular flange of an internal diameter greater than the diameter of the disk member and having a surface which normally overlaps an outer surface of the disk member, the peripheral surface of the nut, in the plane of said inwardly directed flange, being circumferentially continuous, the inwardly directed flange of the nut having therein recesses disposed symmetrically with respect to a diameter of the nut, the distance between the outer walls of said recesses being at least as great as the diameter of the disk member and each recess being of a width at least as great as the thickness of that part of the disk member which is of maximum diameter, each recess being substantially less in length than one-quarter the circumference of the flange.

6. A coupling comprising an externally threaded element, a disk-like member, and a union nut designed removably to unite the threaded element and the disk-like member, the nut having internal screw threads for engagement with the threaded element and having an inwardly directed annular flange of an internal diameter less than the diameter of the disk-like member, the peripheral surface of the nut, in the plane of said inwardly directed flange, being devoid of gaps, said flange having an inner surface which normally engages an outer surface of the disk-like member, the flange having therein a pair of gaps, symmetrically disposed with respect to a diameter of the flange, each gap having its end walls so spaced as thereby to permit passage of the disk-like member through the flange from one side to the other only when the axes of the disk-like member and nut are disposed to intersect at a predetermined angle.

7. A coupling comprising a disk-like member fixedly united to and concentric with a tubular part, and an annulus having an inwardly directed flange of an internal diameter less than the diameter of the disk-like member, said flange having an inner surface which normally engages an outer surface of the disk-like member, the inwardly directed flange of the annulus having therein a pair of gaps, symmetrically located with respect to a diameter of the flange, each gap having its end walls so spaced as to permit passage of the disk-like member through the flange of the annulus from one side to the other only when the axes of the disk-like member and annulus are disposed at a predetermined angle of intersection.

8. A valve coupling comprising a disk-like member fixedly united to and concentric with a tubular valve nipple, and a rigid annulus having therein apertures for bolts by which it is normally secured to a support, said annulus having an inwardly directed flange of an internal diameter less than the diameter of the disk-like member, said flange having an inner surface which normally engages an outer surface of the disk-like member, the inwardly directed flange of the annulus having therein a pair of gaps, symmetrically arranged with respect to a diameter of the flange, each gap having its end walls so spaced as to permit passage of the disk-like member through the flange of the annulus from one side to the other only when the axes of the disk-like member and annulus are disposed at a predetermined angle of intersection.

9. A coupling comprising a disk-like member fixedly united to and concentric with a tubular part, the disk-like member constituting one element of a union, and a union nut having internal threads for engagement with the other element of the union, said nut also having an inwardly directed radial flange whose inner diameter is too small to permit passage of the disk-like member therethrough, said inwardly directed flange having gaps therein located symmetrically with respect to a diameter of the nut, the major portion of each gap being disposed at the same side of that diameter of the nut which is substantially perpendicular to the aforesaid diameter of symmetry, a portion of the outer surface of the flange being beveled off at an angle of approximately 45° to the plane of the face of the nut, said beveled portion being less than a semi-circumference in extent and being symmetrically arranged with respect to said diameter of symmetry and located on the opposite side of the center of the nut from the gaps.

10. A coupling comprising a disk-like member fixedly united to and concentric with a tubular part, and an annulus having an inwardly directed flange of an internal diameter less than the diameter of the disk-like member, said flange having an inner surface which normally engages an outer surface of the disk-like member, said inwardly directed flange having gaps therein located symmetrically with respect to the diameter of the nut, the major portion of each gap being disposed at the same side of that diameter of the nut which is substantially perpendicular to the aforesaid diameter of symmetry, a portion of the outer surface of the inwardly directed flange being shaped to provide clearance for the tubular part in separating the annulus from the disk-like member, said clearance portion being of less than a semi-circumference in extent, symmetrical with respect to the diameter of symmetry, and at the opposite side of the center of the nut from the gaps.

11. In combination in a coupling device two elongate parts which are normally axially aligned, one of said parts having an outwardly directed irremovable radial flange and the other of said parts having an external screw thread, a union nut having an internally screw-threaded portion which engages the aforesaid external screw thread, and an inwardly directed irremovable radial flange normally overlapping that face of the outwardly directed flange which is remote from the screw threads, the diameters of the outwardly and inwardly directed flanges being such that said flanges throughout the major part of their circumferences overlap, characterized in that said flanges are so constructed and arranged as to permit them to be disengaged but only when the nut is so disposed that its axis intersects the axes of said elongate parts.

12. A coupling comprising a pair of elongate normally coaxial tubular members, one of said members having an irremovable outwardly directed radial flange at its end and the other having an external screw thread adjacent to its end, and a union nut for uniting the tubular members with their aforesaid ends juxtaposed, said nut having adjacent to one end an internal screw thread normally engaging said external screw thread and having adjacent to its opposite end an inwardly directed irremovable radial flange which normally engages that surface of said inwardly directed flange which is remote from the screw threads, said nut being circumferentially continuous and devoid of peripheral gaps at the region of its inwardly directed flange and the aforesaid flanges normally overlapping throughout the major portions of their circumferences, characterized in that one at least of said flanges has a plurality of slots extending through it from one of its radial faces to the other, said slots being so located and arranged as to permit disengagement of the flanges but only when the nut is so disposed that its axis intersects the axes of the tubular members at an acute angle.

RUSSELL C. KINSMAN.